(12) United States Patent
Abedini et al.

(10) Patent No.: US 11,026,186 B2
(45) Date of Patent: Jun. 1, 2021

(54) POWER CONTROL FOR CONCURRENT RECEPTION

(71) Applicant: QUALCOMM Incorporated, San Diego, CA (US)

(72) Inventors: Navid Abedini, Somerset, NJ (US); Junyi Li, Chester, NJ (US); Karl Georg Hampel, Hoboken, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 55 days.

(21) Appl. No.: 16/144,530

(22) Filed: Sep. 27, 2018

(65) Prior Publication Data
US 2019/0132805 A1 May 2, 2019

Related U.S. Application Data

(60) Provisional application No. 62/578,303, filed on Oct. 27, 2017.

(51) Int. Cl.
*H04W 52/24* (2009.01)
*H04W 52/46* (2009.01)
(Continued)

(52) U.S. Cl.
CPC ......... *H04W 52/243* (2013.01); *H04L 1/0026* (2013.01); *H04L 5/0044* (2013.01);
(Continued)

(58) Field of Classification Search
CPC ... H04L 1/0026; H04L 5/0044; H04L 5/0053; H04W 52/243; H04W 52/346;
(Continued)

(56) References Cited

U.S. PATENT DOCUMENTS

| | | | | |
|---|---|---|---|---|
| 2004/0095907 A1* | 5/2004 | Agee | ............... | H04B 7/0417 370/334 |
| 2005/0094585 A1* | 5/2005 | Golden | ............... | H04B 7/0408 370/310 |

(Continued)

FOREIGN PATENT DOCUMENTS

WO    WO-2018175784 A1 *   9/2018   ............ H04W 52/42

OTHER PUBLICATIONS

QUALCOMM: "Motivation for SID on Integrated Access & Backhaul (IAB) in NR", 3GPP Draft; RP-170176 Motivation for SID on IAB in NR, 3rd Generation Partnership Project (3GPP), Mobile Competence Centre; 650, Route Des Lucioles; F-06921 Sophia-Antipolis Cedex; France, No. Dubrovnik, Croatia; 20170306-20170309 Mar. 5, 2017, XP051233621, Retrieved from the Internet: URL:http://www.3gpp.org/ftp/Meetings_3GPP_SYNC/RAN/Docs/ [retrieved on Mar. 5, 2017], 14 pages.

(Continued)

*Primary Examiner* — Un C Cho
*Assistant Examiner* — Jose L Perez
(74) *Attorney, Agent, or Firm* — Harrity & Harrity, LLP/Qualcomm Incorporated

(57) ABSTRACT

Various aspects of the present disclosure generally relate to wireless communication. In some aspects, a control node may determine, for a target wireless node in communication with a plurality of other wireless nodes via a plurality of links of a network, a plurality of powers for the plurality of links, wherein the plurality of powers are selected to control inter-link interference or to satisfy a maximum power criterion. The control node may cause at least one of the target wireless node or the plurality of other wireless nodes to use the plurality of powers for concurrent transmissions to the target wireless node using the plurality of links based at least (Continued)

in part on determining the plurality of powers. Numerous other aspects are provided.

33 Claims, 14 Drawing Sheets

(51) Int. Cl.
    *H04W 52/38*     (2009.01)
    *H04L 1/00*     (2006.01)
    *H04L 5/00*     (2006.01)
    *H04W 52/34*     (2009.01)
    *H04W 52/54*     (2009.01)
    *H04W 52/36*     (2009.01)

(52) U.S. Cl.
    CPC ......... *H04L 5/0053* (2013.01); *H04W 52/346* (2013.01); *H04W 52/38* (2013.01); *H04W 52/46* (2013.01); *H04W 52/54* (2013.01); *H04W 52/367* (2013.01); *H04W 52/386* (2013.01)

(58) Field of Classification Search
    CPC ..... H04W 52/54; H04W 52/38; H04W 52/46; H04W 52/367; H04W 52/386
    See application file for complete search history.

(56) References Cited

U.S. PATENT DOCUMENTS

| | | | |
|---|---|---|---|
| 2008/0159184 A1* | 7/2008 | Niwano | H04W 52/346 370/278 |
| 2011/0274047 A1* | 11/2011 | Kwon | H04W 52/16 370/328 |
| 2011/0319120 A1* | 12/2011 | Chen | H04W 52/367 455/522 |
| 2012/0149412 A1* | 6/2012 | Nergis | H04B 1/525 455/501 |
| 2012/0281556 A1* | 11/2012 | Sayana | H04L 5/0035 370/252 |
| 2013/0324182 A1* | 12/2013 | Deng | H04W 52/242 455/522 |
| 2014/0211734 A1* | 7/2014 | Seo | H04B 7/0639 370/329 |
| 2015/0055497 A1 | 2/2015 | Cheng et al. | |
| 2015/0351044 A1* | 12/2015 | Boudreau | H04W 72/0473 370/329 |
| 2016/0044486 A1* | 2/2016 | Pais | H04W 8/005 370/252 |
| 2016/0204838 A1* | 7/2016 | Park | H04W 72/1205 370/252 |
| 2016/0242126 A1* | 8/2016 | Fujishiro | H04W 52/54 |
| 2017/0215179 A1* | 7/2017 | Choi | H04L 1/0025 |
| 2018/0167889 A1* | 6/2018 | Rajagopal | H04L 5/0073 |
| 2019/0132096 A1 | 5/2019 | Abedini et al. | |
| 2020/0163023 A1* | 5/2020 | Pelletier | H04W 72/042 |

OTHER PUBLICATIONS

International Search Report and Written Opinion—PCT/US2018/053329—ISA/EPO—dated Nov. 23, 2018.

ZTE, et al., "Discussion on Self-backhaul Nodes for Dense Cell Deployment," 3GPP Draft; RP-150169 Discussion on Self-Backhaul Nodes for Dense Cells, 3rd Generation Partnership Project (3GPP), Mobile Competence Centre; 650, Route Des Lucioles; F-06921 Sophia-Antipolis Cedex, vol. TSG RAN, No. Shanghai, China; 20150309-20150312, Mar. 2, 2015, XP050931901, 4 pages, Retrieved from the Internet: http://www.3gpp.org/ftp/Meetings_3GPP_SYNC/RAN/Docs/ [retrieved on Mar. 2, 2015].

* cited by examiner

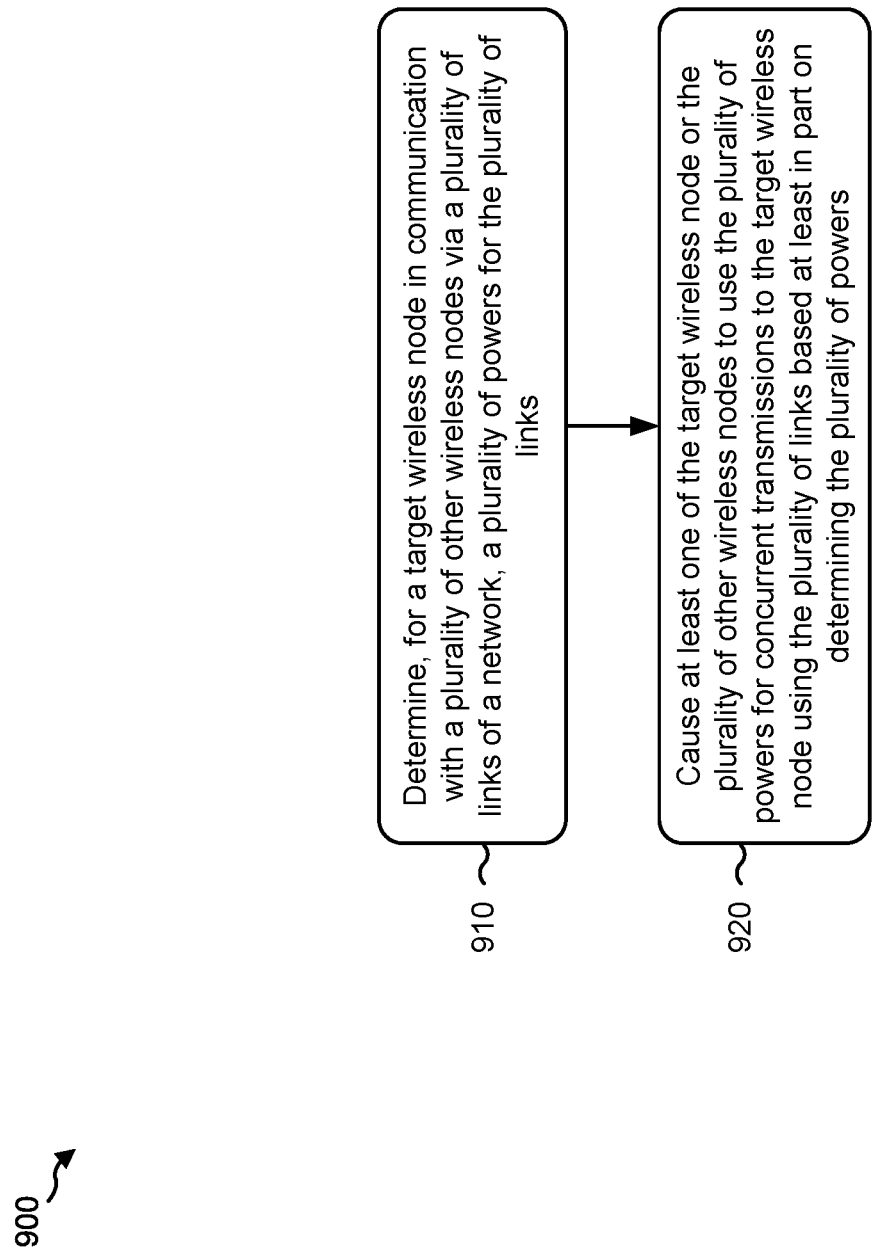

POWER CONTROL FOR CONCURRENT RECEPTION

CROSS-REFERENCE TO RELATED APPLICATIONS UNDER 35 U.S.C. § 119

This application claims priority to U.S. Provisional Patent Application No. 62/578,303, filed on Oct. 27, 2017, entitled "TECHNIQUES AND APPARATUSES FOR POWER CONTROL FOR CONCURRENT RECEPTION," which is hereby expressly incorporated by reference herein.

FIELD OF THE DISCLOSURE

Aspects of the present disclosure generally relate to wireless communication, and more particularly to techniques and apparatuses for power control for concurrent reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include determining, for a target wireless node in communication with a plurality of other wireless nodes via a plurality of links of a network, a plurality of powers for the plurality of links, wherein the plurality of powers are selected to control inter-link interference or to satisfy a maximum power criterion. The method may include causing at least one of the target wireless node or the plurality of other wireless nodes to use the plurality of powers for concurrent transmissions to the target wireless node using the plurality of links based at least in part on determining the plurality of powers.

In some aspects, the method may include causing the target wireless node to use the plurality of powers for a reception from the plurality of other nodes using at least one of the plurality of links. In some aspects, the method may include causing the target wireless node to use the plurality of powers for a transmission to at least one of the plurality of other wireless nodes using at least one of the plurality of links.

In some aspects, a control node for wireless communication may include memory and one or more processors operatively coupled to the memory. The memory and the one or more processors may be configured to determine, for a target wireless node in communication with a plurality of other wireless nodes via a plurality of links of a network, a plurality of powers for the plurality of links, wherein the plurality of powers are selected to control inter-link interference or to satisfy a maximum power criterion. The memory and the one or more processors may be configured to cause at least one of the target wireless node or the plurality of other wireless nodes to use the plurality of powers for concurrent transmissions to the target wireless node using the plurality of links based at least in part on determining the plurality of powers.

In some aspects, a non-transitory computer-readable medium may store one or more instructions for wireless communication. The one or more instructions, when executed by one or more processors of a control node, may cause the one or more processors to determine, for a target wireless node in communication with a plurality of other wireless nodes via a plurality of links of a network, a plurality of powers for the plurality of links, wherein the plurality of powers are selected to control inter-link interference or to satisfy a maximum power criterion. The one or more instructions, when executed by the one or more processors, may cause the one or more processors to cause at least one of the target wireless node or the plurality of other wireless nodes to use the plurality of powers for concurrent transmissions to the target wireless node using the plurality of links based at least in part on determining the plurality of powers.

In some aspects, an apparatus for wireless communication may include means for determining, for a target wireless node in communication with a plurality of other wireless nodes via a plurality of links of a network, a plurality of powers for the plurality of links, wherein the plurality of powers are selected to control inter-link interference or to satisfy a maximum power criterion. The apparatus may include means for causing at least one of the target wireless node or the plurality of other wireless nodes to use the plurality of powers for concurrent transmissions to the target wireless node using the plurality of links based at least in part on determining the plurality of powers.

In some aspects, a method of wireless communication may include determining, for a target wireless node in communication with at least one other wireless node via at least one link of a network, a plurality of powers for the at least one link, wherein the plurality of powers are selected to control inter-link interference or to satisfy a maximum power criterion. The method may include causing at least one of the target wireless node or the at least one other wireless node to use the plurality of powers for concurrent transmissions using the at least one link based at least in part on determining the plurality of powers.

In some aspects, a control node for wireless communication may include memory and one or more processors operatively coupled to the memory. The memory and the one or more processors may be configured to determine, for a target wireless node in communication with at least one other wireless node via at least one link of a network, a plurality of powers for the at least one link, wherein the plurality of powers are selected to control inter-link interference or to satisfy a maximum power criterion. The memory and the one or more processors may be configured to cause at least one of the target wireless node or the at least one other wireless node to use the plurality of powers for concurrent transmissions using the at least one link based at least in part on determining the plurality of powers.

In some aspects, a non-transitory computer-readable medium may store one or more instructions for wireless communication. The one or more instructions, when executed by one or more processors of a control node, may cause the one or more processors to determine, for a target wireless node in communication with at least one other wireless node via at least one link of a network, a plurality of powers for the at least one link, wherein the plurality of powers are selected to control inter-link interference or to satisfy a maximum power criterion. The one or more instructions, when executed by the one or more processors, may cause the one or more processors to cause at least one of the target wireless node or the at least one other wireless node to use the plurality of powers for concurrent transmissions using the at least one link based at least in part on determining the plurality of powers.

In some aspects, an apparatus for wireless communication may include means for determining, for a target wireless node in communication with at least one other wireless node via at least one link of a network, a plurality of powers for the at least one link, wherein the plurality of powers are selected to control inter-link interference or to satisfy a maximum power criterion. The apparatus may include means for causing at least one of the target wireless node or the at least one other wireless node to use the plurality of powers for concurrent transmissions using the at least one link based at least in part on determining the plurality of powers.

Aspects generally include a method, apparatus, device, computer program product, non-transitory computer-readable medium, user equipment, wireless communication device, base station, access point, wireless node, access node, control node, scheduler node, central unit, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a control node, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
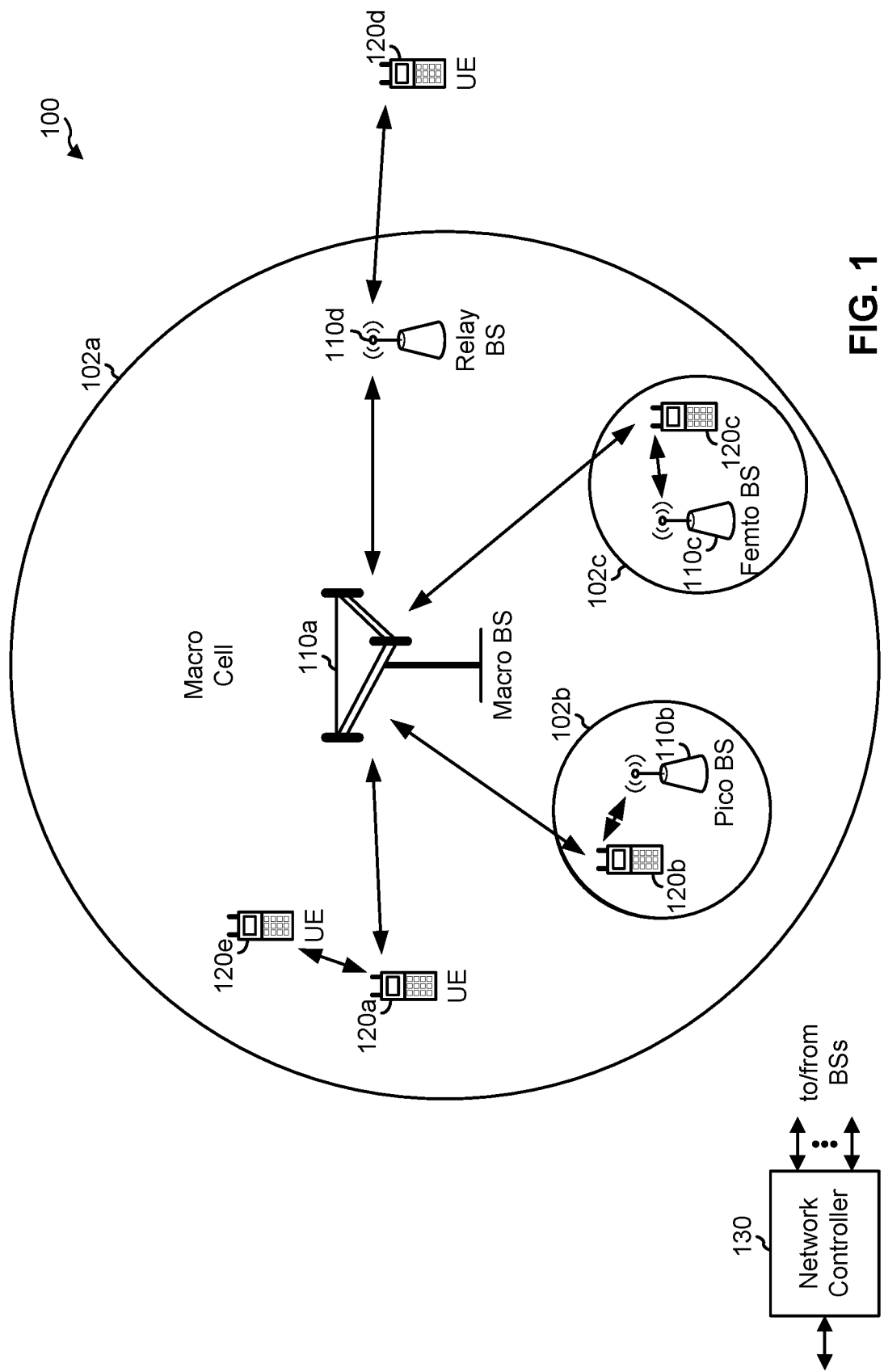
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
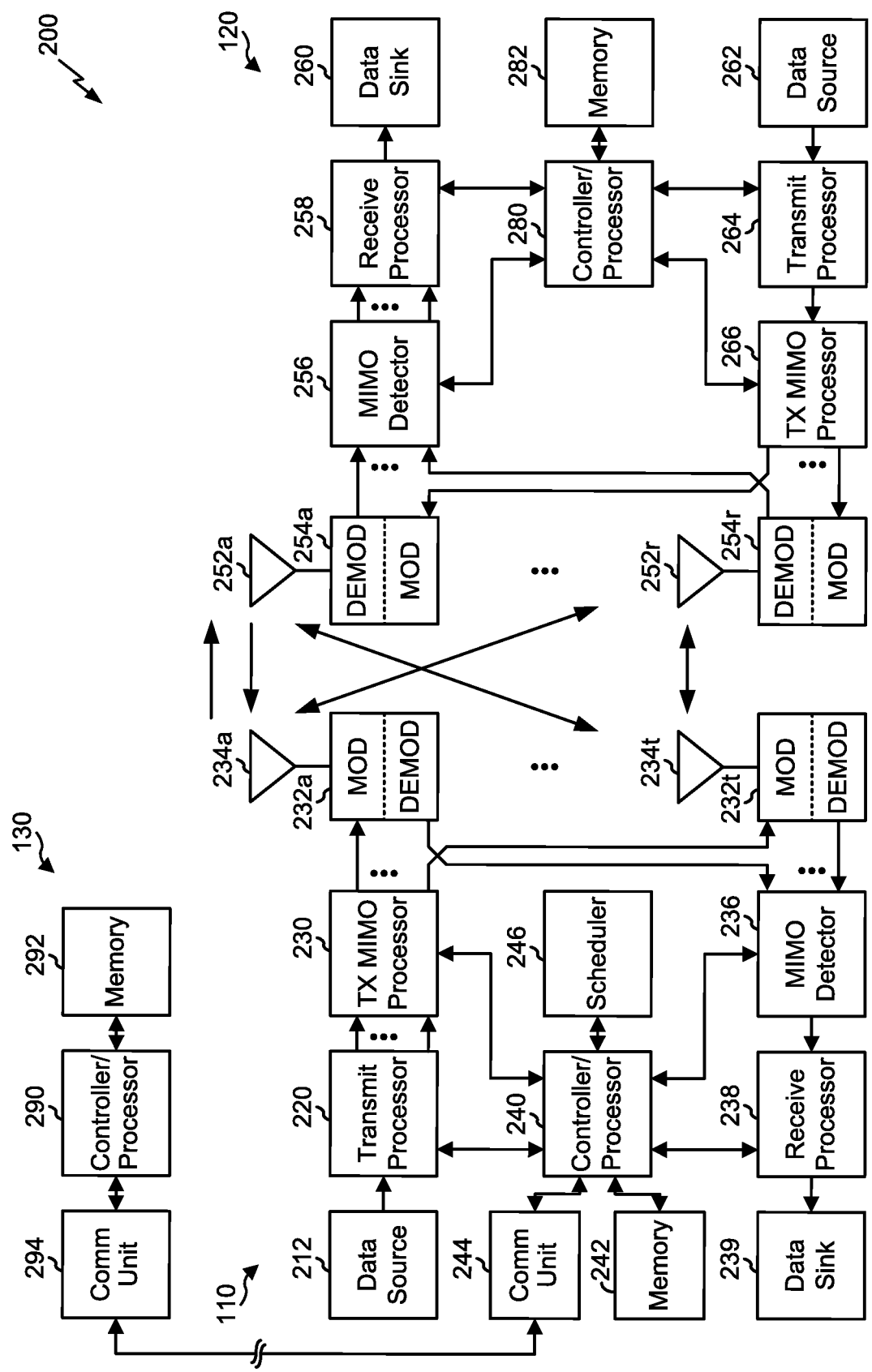
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with power control for concurrent reception, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining, for a target wireless node in communication with a plurality of other wireless nodes via a plurality of links of a network, a plurality of powers for the plurality of links, means for causing at least one of the target wireless node or the plurality of other wireless nodes to use the plurality of powers for concurrent transmissions to the target wireless node using the plurality of links based at least in part on determining the plurality of powers, and/or the like. In some aspects, such means may include one or more components of UE 120 described in connection with FIG. 2.

In some aspects, base station 110 may include means for determining, for a target wireless node in communication with a plurality of other wireless nodes via a plurality of links of a network, a plurality of powers for the plurality of links, means for causing the plurality of other wireless nodes to use the plurality of powers for concurrent transmissions to the target wireless node using the plurality of links based at least in part on determining the plurality of powers, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
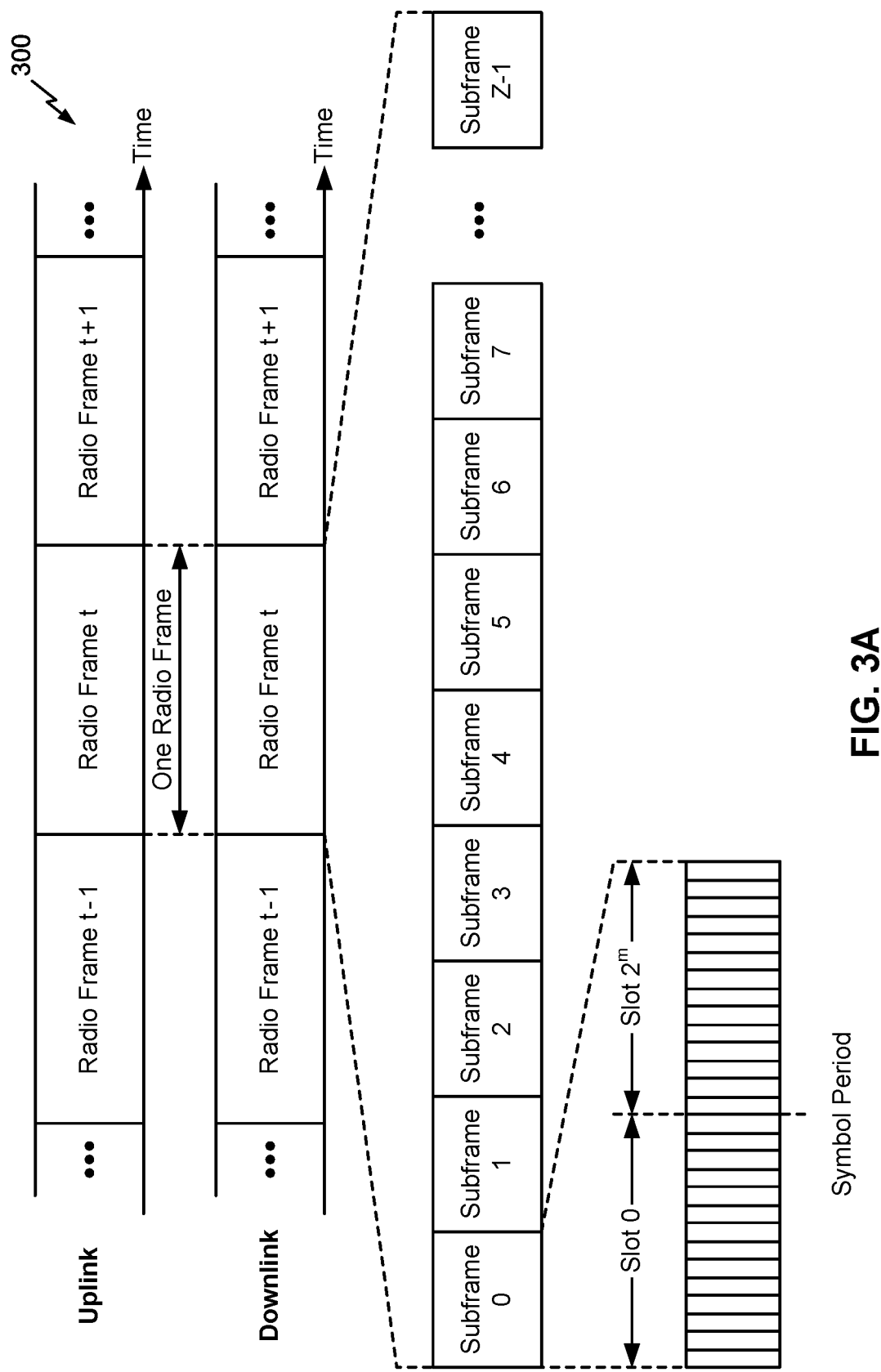
FIGS. 3A and 3B are block diagrams conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
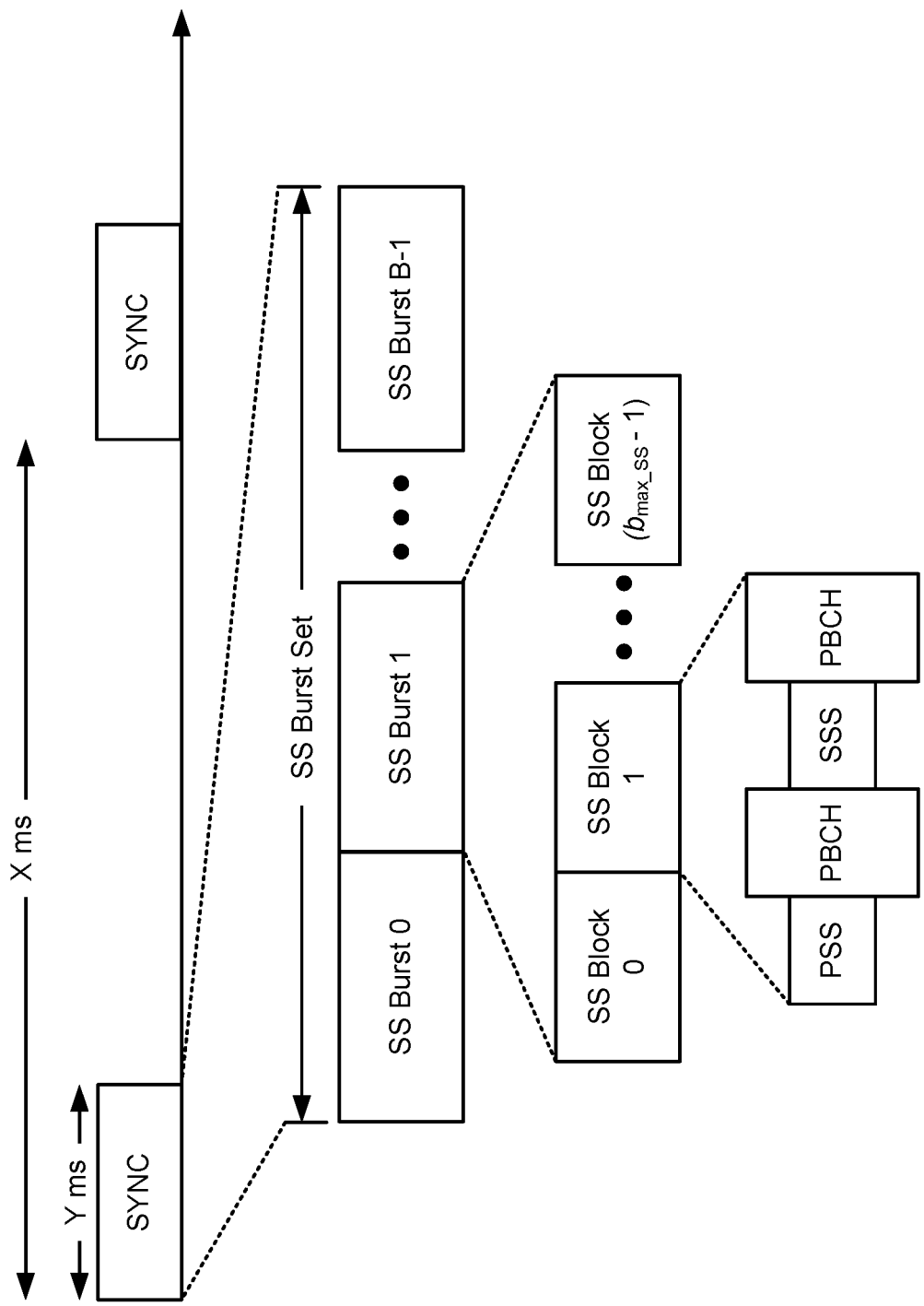

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
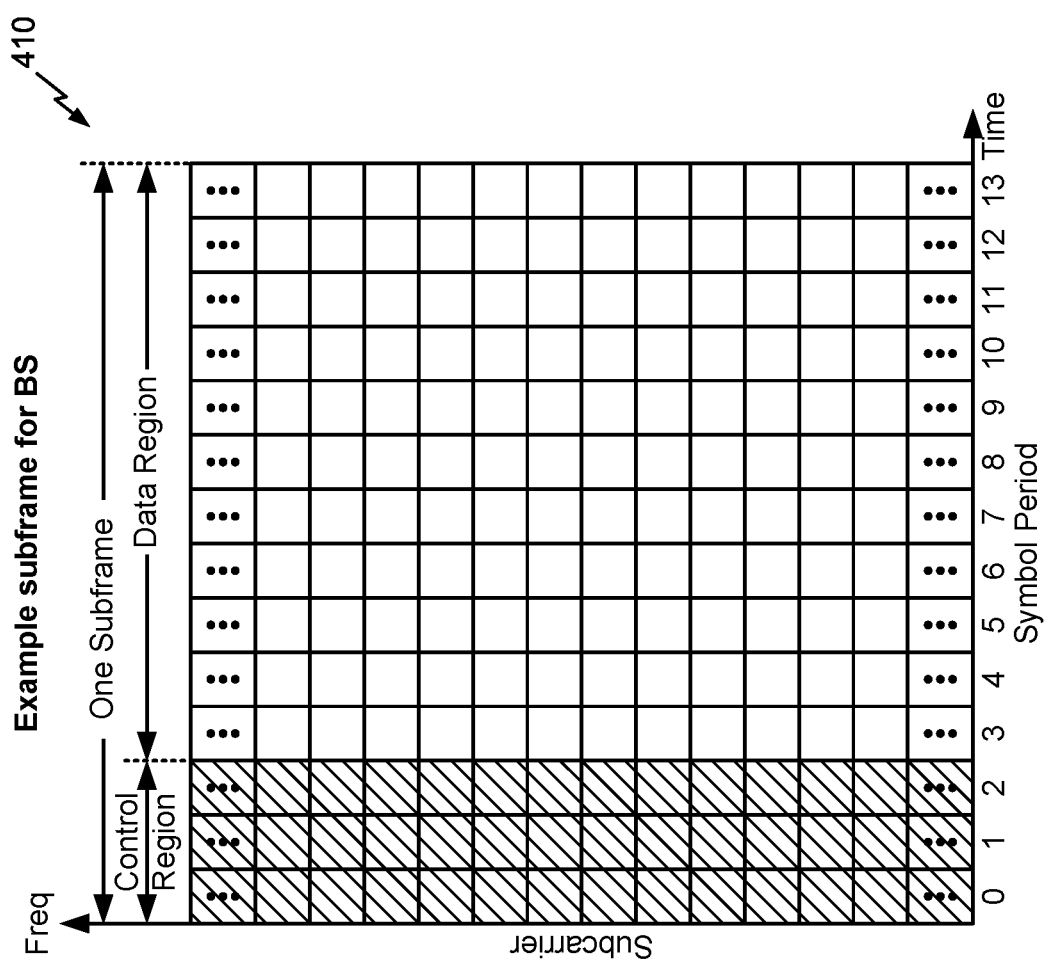
FIG. 4 is a block diagram conceptually illustrating an example subframe format with the normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
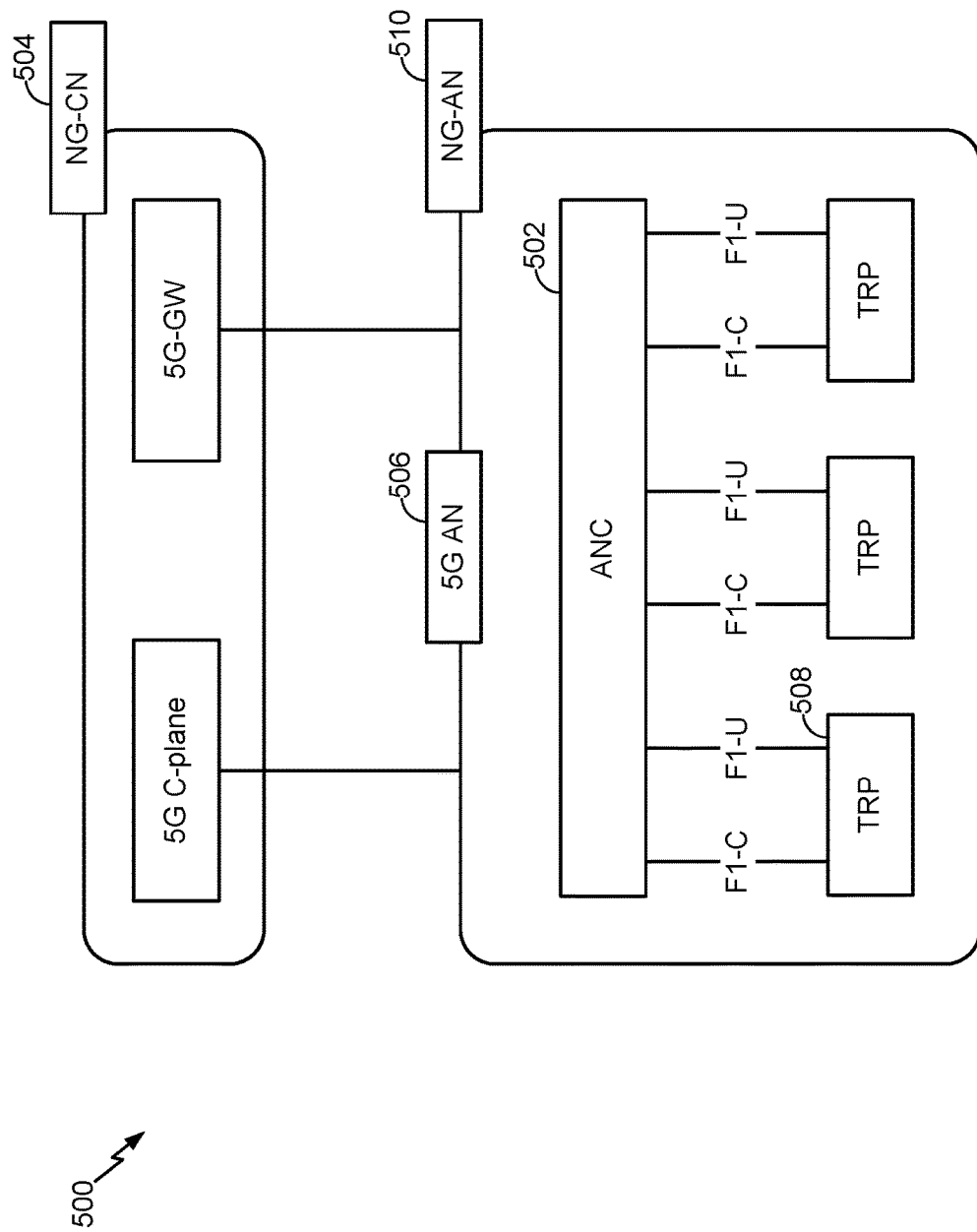
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
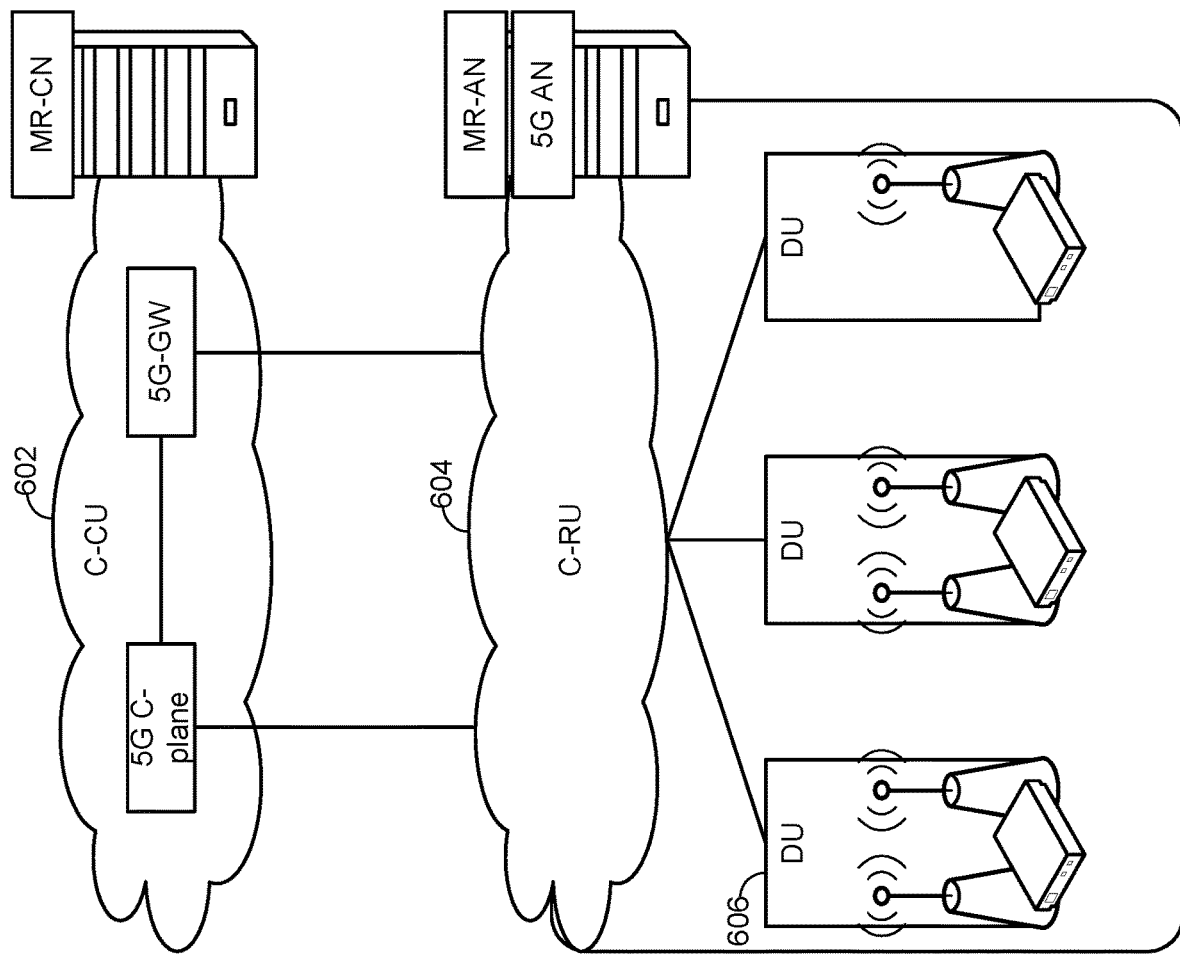
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7A:
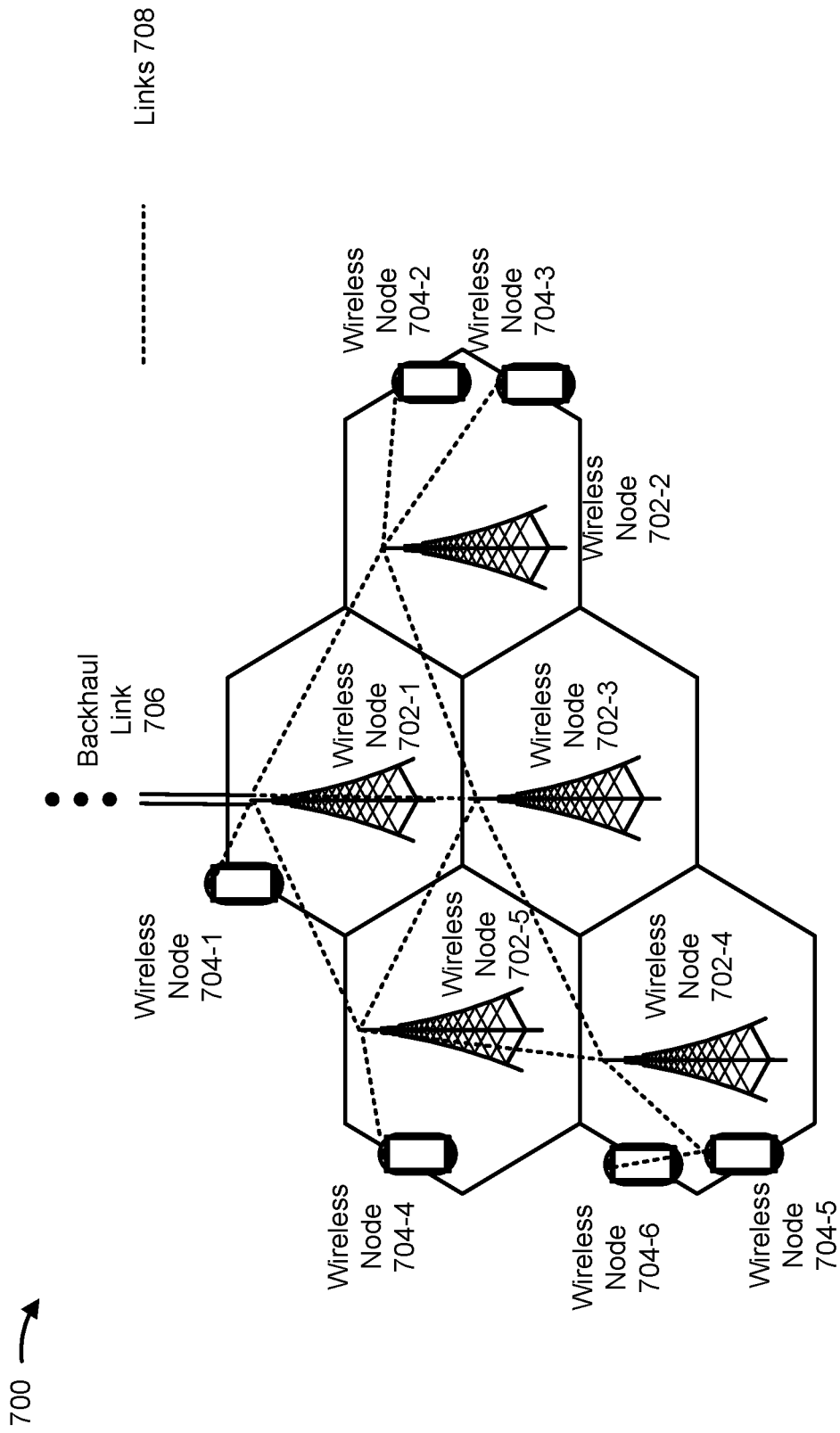
FIGS. 7A and 7B are diagrams illustrating an example of a network topology for a network, in accordance with various aspects of the present disclosure.
Figure 7B:
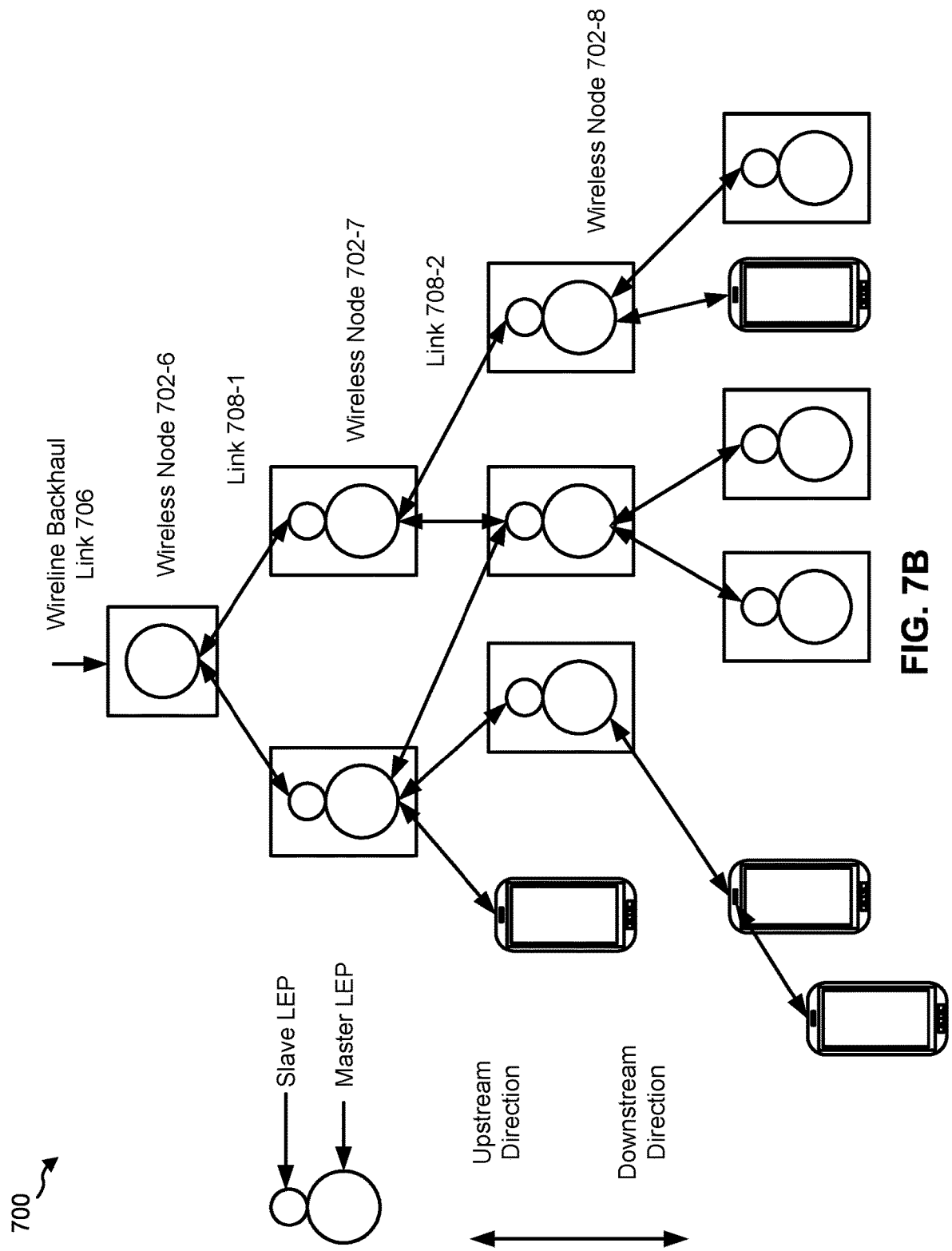

FIGS. 7A and 7B are diagrams illustrating an example 700 of a network topology for a network, in accordance with various aspects of the present disclosure. Self-backhauling or integrated access/backhaul (IAB) may be deployed to use a common set of resources for access traffic and backhaul traffic. For example, a first wireless node (e.g., a BS 110, a UE 120, and/or the like) may communicate backhaul traffic via first mmWave resources with a second wireless node, and may communicate access traffic via second mmWave resources with a third wireless node.

As shown in FIG. 7A, example 700 may include multiple wireless nodes 702 (e.g., BSs) and multiple wireless nodes 704 (e.g., UEs). At least one wireless node (e.g., wireless node 702-1) may communicate with a core network via a backhaul link 706, such as a fiber connection, a wireless backhaul connection, and/or the like. Wireless nodes 702 and 704 may communicate with each other using a set of links 708, such as a set of mmWave links; a 3G, 4G, 5G, etc. air interface; and/or the like. In some aspects, a wireless node 702 may correspond to BS 110 or UE 120 shown in FIG. 1. Similarly, a wireless node 704 may correspond to BS 110 or a UE 120 shown in FIG. 1.

As further shown in FIG. 7A, one or more wireless nodes 702 or 704 may communicate indirectly via one or more other wireless nodes 702 or 704. For example, data may be transferred from a core network to wireless node 704-6 via backhaul link 706, a link 708 between wireless node 702-1 and wireless node 702-5, a link 708 between wireless node 702-5 and wireless node 702-4, a link 708 between wireless node 702-4 and wireless node 704-5, and a link 708 between wireless node 704-5 and wireless node 704-6. In some aspects, multiple different paths may be used to communicate data between wireless nodes 702 or 704. For example, wireless node 702-5 may communicate with wireless node 702-4 via a single link 708 between wireless node 702-5 and wireless node 702-4 (e.g., a direct link) and/or via a first link 708 between wireless node 702-5 and wireless node 702-3 and a second link between wireless node 702-3 and wireless node 702-4 (e.g., an indirect link).

As shown in FIG. 7B, wireless nodes 702 and wireless nodes 704 can be arranged in a hierarchical topology to enable management of network resources. Each link 708 may be associated with a master link end point (master LEP) and a slave link end point (slave LEP), which may define a hierarchy between wireless nodes 702 or 704. For example, wireless node 702-6 may communicate with wireless node 702-7 via link 708-1. In this case, wireless node 702-6 is associated with a master link end point and wireless node 702-7 is associated with a slave link end point for link 708-1, which may define wireless node 702-6 as hierarchically superior to wireless node 702-7, and wireless node 702-7 as hierarchically inferior to wireless node 702-6 with regard to link 708-1. Moreover, wireless node 702-6 may be defined as upstream relative to wireless node 702-7 (and wireless node 702-7 may be defined as downstream relative to wireless node 702-6).

Similarly, wireless node 702-7 includes a master link end point for link 708-2 and wireless node 702-8 includes a slave link end point for backhaul link 708-2. In this case, wireless node 702-7 is hierarchically superior and upstream to wireless node 702-8, and wireless node 702-8 is hierarchically inferior and downstream to wireless node 702-7 with regard to link 708-2. In some aspects, a wireless node 702 or 704 may include a single antenna or antenna array for both the slave link end point and master link end point. In some aspects, a wireless node 702 or 704 may include a first antenna or antenna array for the slave link end point and a second antenna or antenna array for the master link end point.

In some aspects, wireless node 702-6, or a central unit, may be referred to herein as an IAB-donor. The IAB-donor may be the RAN node that provides the UE with access to the core network and that provides wireless backhauling functionality to IAB nodes. Wireless nodes 702-7, 702-8, and so on may be referred to as IAB nodes. An IAB node may be associated with a mobile terminal (MT), which may act as a UE for the parent IAB node of the IAB node or for the IAB-donor. An IAB node may also be associated with a DU or gNB, which may function as a base station (e.g., a gNB, a gNB-DU with a MAC scheduler, etc.) for child nodes of the IAB node.

As indicated above, FIGS. 7A and 7B are provided as examples. Other examples are possible and may differ from what was described with respect to FIGS. 7A and 7B.

An upstream wireless node may determine a transmission power for transmissions to each downstream wireless node. Similarly, the upstream wireless node may determine a transmission power for transmission from each downstream wireless node (e.g., transmission to the upstream wireless node, to subsequent downstream wireless nodes, and/or the like). However, in some network topologies, a downstream wireless node may experience inter-link interference when receiving a plurality of transmissions via a plurality of links, such as from a plurality of upstream wireless nodes, from an upstream wireless node and from a downstream wireless node, from a plurality of downstream wireless nodes, and/or the like. Moreover, the upstream wireless node or the downstream wireless node may be associated with a threshold maximum power, such as a threshold maximum transmit power, a threshold maximum receive power, and/or the like, and may receive an instruction that is to cause a transmission to exceed the threshold maximum power.

Some aspects, described herein, may enable power control for concurrent reception. For example, a control node may determine a plurality of powers for a plurality of transmissions to a target wireless node via a plurality of links and from a plurality of other wireless nodes. The plurality of powers may include a plurality of transmit powers by the other plurality of wireless nodes, a plurality of receive powers (e.g., a plurality of gain values) used by the target wireless node, and/or the like. The plurality of powers may be selected to control inter-link interference and/or to satisfy a maximum power criterion. In this case, the control node may cause the plurality of other wireless nodes to transmit, via the plurality of links, the plurality of transmissions using the plurality of powers. In this way, the control node enables communications for a particular network topology, such as in a self-backhauling network, an IAB network, and/or the like.

Figure 8A:
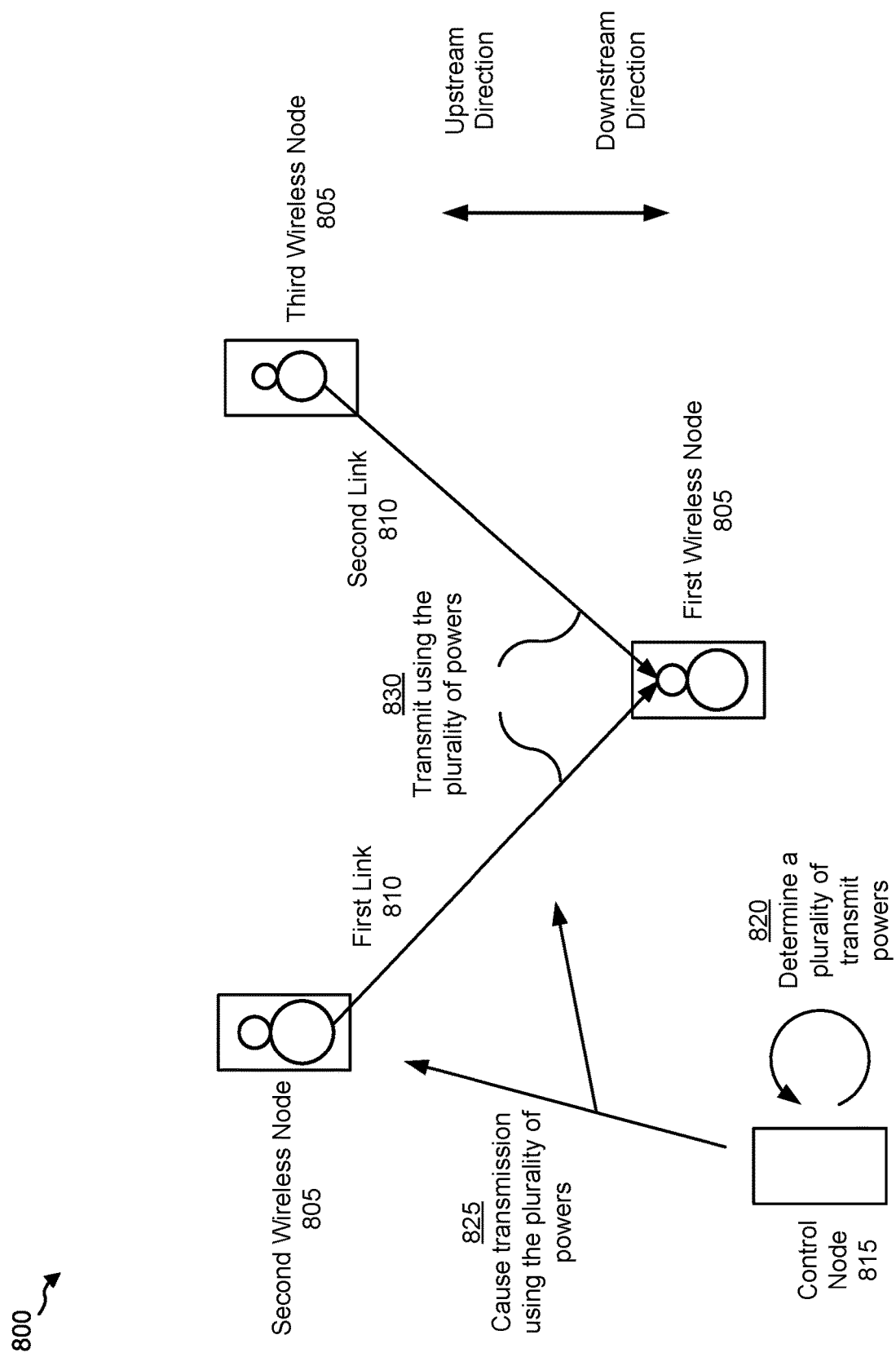
FIGS. 8A and 8B are diagrams illustrating an example of power control for concurrent reception, in accordance with various aspects of the present disclosure.
Figure 8B:
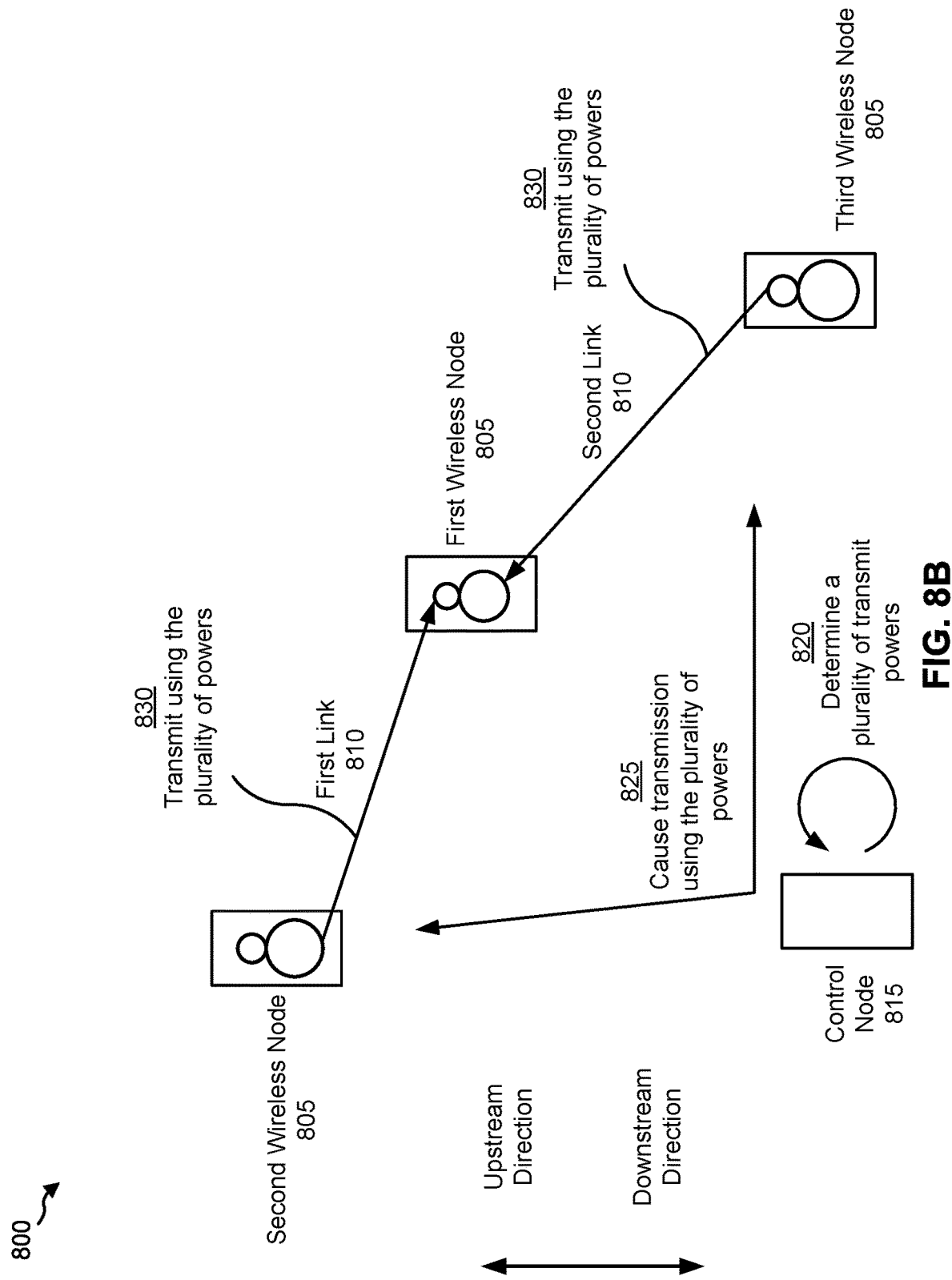

FIGS. 8A and 8B are diagrams illustrating an example 800 of power control for concurrent reception, in accordance with various aspects of the present disclosure. As shown in FIGS. 8A and 8B, example 800 may include a first wireless node 805, which may be in communication with a second wireless node 805 via a first link 810 and in communication with a third wireless node 805 via a second link 810, and a control node 815.

In some aspects, wireless nodes 805 may correspond to BS 110, UE 120, wireless node 702, wireless node 704, and/or the like. In some aspects, links 810 may correspond to links 708. In some aspects, control node 815 may correspond to BS 110, UE 120, wireless node 702, wireless node 704, and/or the like. In some aspects, control node 815 may be one or more of wireless nodes 805. For example, control node 815 may be first wireless node 805. In some aspects, control node 815 may be a group of wireless nodes, such as one or more of wireless nodes 805, one or more other wireless nodes, and/or the like. In some aspects, control node 815 may be a device separate from wireless nodes 805, such as another node of the network, a central unit, an integrated access and backhaul (IAB)-donor, a scheduler node, and/or the like.

With regard to FIG. 8A, first wireless node 805 may be downstream of both second wireless node 805 and third wireless node 805. For example, first wireless node 805 may be a user equipment-function (UE-F), and second wireless node 805 and third wireless node 805 may be access node-functions (ANFs). In contrast, with regard to FIG. 8B, first wireless node 805 may be downstream of second wireless node 805 and upstream of third wireless node 805. For example, second wireless node 805 may be an ANF of first wireless node 805, which may be a UE-F of second wireless node 805, and first wireless node 805 may be an ANF of third wireless node 805, which may be a UE-F of second wireless node 805. In this case, first wireless node 805 may be a relay node. In some aspects, first wireless node 805 may support concurrent communication with second wireless node 805 and third wireless node 805 (e.g., using FDM, space division multiplexing (SDM), multiple user MIMO (MU-MIMO), and/or the like).

In some aspects, a wireless node 805 may schedule communications on a link 810. For example, with regard to FIG. 8A, second wireless node 805 may schedule communications on first link 810 and third wireless node 805 may schedule communications on second link 810. In contrast, with regard to FIG. 8B, second wireless node 805 may schedule communications on first link 810 and first wireless node 805 may schedule communications on second link 810. Although aspects, described herein, are described in terms of a first wireless node 805, a second wireless node 805, and a third wireless node 805, other quantities of wireless nodes 805, arrangements of wireless nodes 805, and/or the like are possible.

As shown in FIGS. 8A and 8B, and by reference number 820, control node 815 may determine a plurality of powers for links 810. For example, control node 815 may determine a first power for first link 810 and a second power for second link 810. In some aspects, the plurality of powers may be a plurality of transmit powers. For example, control node 815 may determine a first power with which second wireless node 805 is to transmit to first wireless node 805 (e.g., a target wireless node) and a second power with which third wireless node 805 is to transmit to first wireless node 805. Additionally, or alternatively, the plurality of powers may be a plurality of receive powers. For example, control node 815 may determine a receiver configuration (e.g., a gain configuration of first wireless node 805) associated with causing first wireless node 805 to receive concurrent transmissions from second wireless node 805 and third wireless node 805 at a selected plurality of powers. In some aspects, the plurality of powers may include one or more transmit powers and one or more receive powers. For example, control node 815 may control transmission powers of a first plurality of transmissions from first wireless node 805 and receive powers of a second plurality of transmissions to first wireless node 805.

In some aspects, control node 815 may select the plurality of powers for links 810 to control inter-link interference. For example, control node 815 may select the plurality of powers to ensure that a transmission from second wireless node 805 does not interfere with another transmission from third wireless node 805. In some aspects, control node 815 may select the plurality of powers for links 810 to satisfy a maximum power criterion. For example, when first wireless node 805 is to use a single antenna or antenna array associated with a threshold maximum power for concurrent reception of a plurality of transmissions from second wireless node 805 and third wireless node 805, control node 815 may select the plurality of powers to share portions of available power such that the threshold maximum power is not exceeded.

In some aspects, control node 815 may statically determine the plurality of powers. For example, at a particular time, control node 815 may be triggered to determine the plurality of powers, such as at an initial configuration time, when a connection to second wireless device and/or third wireless node 805 is established by first wireless node 805, and/or the like. In this case, control node 815 may determine the plurality of powers and configure the plurality of powers for subsequent use. In some aspects, control node 815 may semi-statically determine the plurality of powers for a particular type of signal, for example, for a power-sensitive signal, such as a reference signal. For example, control node 815 may semi-statically determine the plurality of powers for a periodic channel state information reference signal (CSI-RS), a radio resource management reference signal (RRM RS), and/or the like.

In some aspects, control node 815 may dynamically determine the plurality of powers. For example, control node 815 may, after determining a first plurality of powers at a first time, determine a second plurality of powers at a second time, such as based at least in part on a change to a network configuration, a change to a network characteristic (e.g., a signal to interference noise ratio or another network characteristic), and/or the like. Additionally, or alternatively, control node 815 may dynamically determine a subset of the plurality of powers. For example, control node 815 may statically determine a first power (e.g., for first link 810), and may dynamically determine and update a second power (e.g., for second link 810, another link 810, and/or the like).

In some aspects, control node 815 may determine the plurality of powers based at least in part on received signaling. For example, control node 815 may receive signaling from a central unit (CU) of a network; a wireless node 805 of the network; a group of wireless nodes, which may include first wireless node, 805, second wireless node 805, or third wireless node 805; a control node; a scheduler node; and/or the like. In some aspects, the received signaling may include information identifying the plurality of powers. For example, a central unit may provide signaling, which may specify the plurality of powers, to control node 815 and control node 815 may cause wireless nodes 805 to transmit via links 810 using the plurality of powers.

Additionally, or alternatively, the received signaling may include information relating to the plurality of powers. For example, a scheduler node, first wireless node 805, second wireless node 805, third wireless node 805, and/or the like may provide information identifying a schedule for transmissions, and control node 815 may determine the plurality of powers based at least in part on the schedule for transmissions. In some aspects, the received signaling may be upper layer signaling, such as signaling from a device associated with controlling and/or configuring the network.

In some aspects, control node 815 may determine the plurality of powers based at least in part on stored configuration information. For example, control node 815 may store static configuration information associated with identifying powers for a plurality of transmissions, and may determine the plurality of powers based at least in part on the stored static configuration information.

In some aspects, control node 815 may provide signaling relating to the plurality of powers. For example, control node 815 may provide signaling to a scheduler node, a central unit, first wireless node 805, second wireless node 805, third wireless node 805, an upper layer of the network (e.g., a device associated with network control, scheduling, and/or configuration), and/or the like to identify a parameter relating to the power, such as a parameter identifying the maximum power criterion.

Additionally, or alternatively, control node 815 may provide signaling identifying the plurality of powers. For example, control node 815 may transmit an indicator of a power to a wireless node 805 or another control node 815 to enable the wireless node 805 or the other control node 815 to select another power to avoid inter-link interference between transmissions. In some aspects, second wireless node 805 may be designated as a primary ANF, and may determine the plurality of powers and provide signaling to control node 815 relating to the plurality of powers based at least in part on being designated as a primary ANF.

In some aspects, control node 815 may receive and/or provide signaling identifying a configuration parameter, a request for information identifying the configuration parameter, an approval of the configuration parameter, a disapproval of the configuration parameter, a measurement, a capability indication, a limitation indication, a schedule, and/or the like. For example, control node 815 may request a measurement of a network or an indication of an amount of data for transmission from first wireless node 805, receive a response to the request, determine a plurality of powers based at least in part on the response and a schedule for first wireless node 805, provide a configuration parameter identifying the plurality of powers, and receive an approval message approving of the configuration parameter.

In some aspects, control node 815 may determine the plurality of powers based at least in part on a characteristic of the network, a device in the network, traffic being communicated via the network, and/or the like. For example, control node 815 may determine the plurality of powers based at least in part on a type of signal for transmission, a type of a wireless node (e.g., a type of first wireless node 805, second wireless node 805, third wireless node 805, and/or the like), a state of a wireless node (e.g., a state of first wireless node 805, second wireless node 805, third wireless node 805, and/or the like), a timing of the signal, an angular direction of the signal, a configuration of a channel or signal for transmission, a priority of a channel or signal for transmission, and/or the like.

In some aspects, control node 815 may determine a range of powers. For example, control node 815 may determine a maximum power for a transmission based at least in part on, for example, a type of signal or type of channel for transmission, and may provide information identifying the maximum power to enable, for example, second wireless node 805 or third wireless node 805 to configure transmission to a lower power than the maximum power. Additionally, or alternatively, control node 815 may determine a minimum power for a transmission, and may provide information identifying the minimum power.

In some aspects, control node 815 may determine the plurality of powers based at least in part on a prioritization. For example, control node 815 may determine that a control signal is to be associated with a higher prioritization than a payload signal; a scheduling request is to be associated with a higher priority than a channel state information signal, a data signal, and a sounding reference signal; and/or the like. Additionally, or alternatively, control node 815 may determine a prioritization in assigning portions of available power based at least in part on whether a wireless node 805 is included in a master cell group, a secondary cell group, an upstream direction, a downstream direction, and/or the like. In some aspects, control node 815 may scale a power to determine the plurality of powers. For example, based at least in part on the maximum power and relative prioritizations relating to first link 810 and second wireless node 805 and to second link 810 and third wireless node 805, control node 815 may scale the maximum power to divide the maximum power or to avoid inter-link interference.

In some aspects, the signaling relating to the power may be a particular type of signal. For example, control node 815 may receive or provide a downlink control information (DCI) signal, an uplink control information (UCI) signal, a media access control (MAC) control element (CE) signal, a radio resource control (RRC) signal, a master information block (MIB) signal, a system information block (SIB) signal, a reference signal (e.g., a synchronization signal, a beam reference signal, a physical downlink shared channel (PDSCH) signal, an acknowledgement signal, a negative acknowledgement signal, a power indication signal, an upper layer signaling signal, an F1-AP signal, a modulation and coding scheme (MCS) indication signal, and/or the like), and/or the like to identify the power or information relating to the power. In this case, control node 815 may receive feedback information from first wireless node 805 (e.g., identifying the MCS, a maximum receive power, and/or the like), and may determine a power based at least in part on the feedback information. Similarly, control node 815 may receive feedback information from first wireless node 805 identifying a request that transmissions be associated with a greater power, and may determine the plurality of powers to increase subsequent transmission power and/or subsequent receive power.

In some aspects, control node 815 may determine a power without receiving signaling from first wireless node 805. For example, when second wireless node 805 and third wireless node 805 are scheduling nodes, second wireless node 805 and third wireless node 805 (e.g., control node 815) may exchange one or more messages to determine transmit powers to transmit to first wireless node 805 without causing inter-link interference or exceeding a maximum transmit power criterion. In some aspects, a first power may be determined based at least in part on a second power. For example, when first wireless node 805 is a scheduling node for second link 810 and a scheduled node for first link 810, control node 815 may determine a power for the first link based at least in part on a power for the second link.

In some aspects, control node 815 may determine a receiver configuration for first wireless node 805 to enable first wireless node 805 to receive transmissions via links 810 from second wireless node 805 and third wireless node 805. For example, control node 815 may determine a receiver power configuration, a low noise amplifier (LNA) gain configuration, a receiver filter configuration, an analog or digital beamforming configuration, and/or the like. In this case, control node 815 may determine a plurality of powers (e.g., gain values) for an LNA of first wireless node 805, and may cause first wireless node 805 to receive a plurality of transmissions using the plurality of powers for the LNA. Similarly, control node 815 may cause first wireless node 805 to adjust a beamforming configuration to alter a relative receive power between links 810.

In some aspects, the plurality of powers are selected to suppress a receive power of a transmission via a link 810. For example, control node 815 may determine a power for a receiver configuration to cause a receive power of a transmission to be suppressed to avoid inter-link interference or to satisfy a maximum power criterion. In some aspects, control node 815 may adjust the receiver configuration based at least in part on a prioritization relating to second wireless node 805, first link 810, third wireless node 805, second link 810, and/or the like.

In some aspects, control node 815 may determine another plurality of powers for first wireless node 805 to transmit to second wireless node 805 and/or third wireless node 805. For example, control node 815 may determine a first transmit power for first link 810 to second wireless node 805, a second transmit power for second link 810 to third wireless node 805, a first receive power for first link 810 from second wireless node 805, and a second receive power for second link 810 from third wireless node 805. In this way, control node 815 (e.g., first wireless node 805) may enable first wireless node 805 to receive concurrent transmissions and provide concurrent transmissions without inter-link interference or without exceeding a maximum transmit power criterion. In some aspects, control node 815 may control a transmit power for an access link based at least in part on back haul communication with a parent node of control node 815.

As further shown in FIGS. 8A and 8B, and by reference number 825, control node 815 may cause transmission using the plurality of powers and, as shown by reference number 830, second wireless node 805 and third wireless node 805 may transmit using the plurality of powers. For example, first wireless node 805 may receive information from second wireless node 805 via first link 810 using a first power, and may, concurrently, receiving information from third wireless node 805 via second link 810 using a second power. In some aspects, control node 815 may transmit signaling (e.g., identifying a power, a receiver configuration relating to a power, and/or the like) to a wireless node 805 to cause transmission, such as to first wireless node 805, second wireless node 805, third wireless node 805, and/or the like. In this way, control node 815 enables first wireless node 805 to receive a plurality of concurrent transmissions without excessive inter-link interference, without exceeding a dynamic range or detection range associated with a receive maximum power criterion, and/or the like. Moreover, control node 815 enables first wireless node 805 to transmit a plurality of concurrent transmissions without excessive inter-link interference, without exceeding a maximum transmit power criterion, and/or the like.

In some aspects, first wireless node 805 may receive payload data using the plurality of powers. Additionally, or alternatively, first wireless node 805 may receive signaling data using the plurality of powers. In some aspects, first wireless node 805 may receive reference signals. For example, when receive a plurality of concurrent reference signals, such as based at least in part on beam-sweeping, second wireless node 805 and/or third wireless node 805 may dynamically adjust a power for each reference signal based at least in part on the plurality of powers.

In some aspects, first wireless node 805 may transmit a relayed signal. For example, first wireless node 805 may be operating in a different frequency, RAT, cell, and/or the like from a direct link between second wireless node 805 and third wireless node 805 to relay signals between second wireless node 805 and third wireless node 805 (e.g., an indirect link). In this case, first wireless node 805 may retransmit a relayed signal using a power of the plurality of powers to enable redundant communications between second wireless node 805 and third wireless node 805. In this case, control node 815 may indicate to first wireless node 805, second wireless node 805, third wireless node 805, and/or the like a power for utilization in the direct link and/or the indirect link.

As indicated above, FIGS. 8A and 8B are provided as examples. Other examples are possible and may differ from what was described with respect to FIGS. 8A and 8B.

FIG. 9 is a diagram illustrating an example process 900 performed, for example, by a wireless node, in accordance with various aspects of the present disclosure. Example process 900 is an example where a control node (e.g., BS 110, UE 120, wireless node 702, wireless node 704, wireless node 805, control node 815, and/or the like) performs power control for concurrent transmissions.

As shown in FIG. 9, in some aspects, process 900 may include determining, for a target wireless node in communication with a plurality of other wireless nodes via a plurality of links of a network, a plurality of powers for the plurality of links (block 910). For example, the control node (e.g., using controller/processor 240, controller/processor 280, and/or the like) may determine the plurality of powers for the plurality of links, as described above. In some aspects, the plurality of powers are selected to control inter-link interference or to satisfy a maximum power criterion.

As shown in FIG. 9, in some aspects, process 900 may include causing at least one of the target wireless node or the plurality of other wireless nodes to use the plurality of powers for concurrent transmissions to the target wireless node using the plurality of links based at least in part on determining the plurality of powers (block 920). For example, the control node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may cause the plurality of other wireless nodes to transmit to the target wireless nodes using the plurality of powers, as described above.

Process 900 may include additional aspects, such as any single aspect or any combination of aspects described below and/or in connection with one or more other processes described elsewhere herein.

In some aspects, the target wireless node is a first wireless node and the plurality of other wireless nodes include a second wireless node communicating with the first wireless node via a first link of the plurality of links and a third wireless node communicating with the first wireless node via a second link of the plurality of links, and the second wireless node is scheduling communications on the first link and the first wireless node is scheduling communications on the second link. In some aspects, the target wireless node is a first wireless node and the plurality of other wireless nodes include a second wireless node communicating with the first wireless node via a first link of the plurality of links and a third wireless node communicating with the first wireless node via a second link of the plurality of links, and the second wireless node is scheduling communications on the first link and the third wireless node is scheduling communications on the second link.

In some aspects, the control node is the target wireless node, another node of the plurality of other wireless nodes, a central unit, an integrated access and backhaul (IAB)-donor, a scheduler node of the network, a group of nodes, and/or the like. In some aspects, the plurality of powers are determined based at least in part on stored configuration information. In some aspects, the plurality of powers are determined based at least in part on received signaling, and the received signaling is received from an upper layer of the network, another wireless node, a central unit, and/or the like. In some aspects, the control node may transmit signaling relating to a power, of the plurality of powers, to an upper layer of the network, another wireless node, a central unit, and/or the like.

In some aspects, signaling, provided to the control node or by the control node, relating to a power, of the plurality of powers, includes information identifying a configuration parameter, a request for information identifying the configuration parameter, an approval of the configuration parameter, a disapproval of the configuration parameter, a measurement, a capability indication, a limitation indication, a schedule, and/or the like. In some aspects, signaling, provided to the control node or by the control node, relating to a power of the plurality of powers, is provided via a downlink control information signal, an uplink control information signal, a media access control control element signal, a radio resource control signal, a master information block signal, a system information block signal, a reference signal, a synchronization signal, a beam reference signal, a physical downlink shared channel signal, an acknowledgement signal, a negative acknowledgement signal, a power indication signal, an upper layer signaling signal, an F1-AP signal a modulation and coding scheme indication signal, and/or the like.

In some aspects, a power, of the plurality of powers, is statically determined. In some aspects, a power, of the plurality of powers, is dynamically determined. In some aspects, a first power, of the plurality of powers, is statically determined, and a second power, of the plurality of powers, is dynamically determined. In some aspects, a power, of the plurality of powers, is determined based at least in part on a type of signal for transmission on a link of the plurality of links, a type of the target wireless node, a type of another wireless node, a state of the target wireless node, a state of the other wireless node, a timing of the signal for transmission on the link of the plurality of links, or an angular direction of the signal for transmission on the link of the plurality of links a configuration of a channel or the signal for transmission on the link of the plurality of links, a capability of at least one wireless node, a priority for the channel or the signal for transmission on the link of the plurality of links, and/or the like.

In some aspects, the control node may determine a maximum power for a transmission using a link of the plurality of links, and the maximum power may be determined based at least in part on at least one of a type of signal for transmission using the link or a type of channel associated with the link. In some aspects, a power, of the plurality of powers, is determined without receiving information from the target wireless node relating to the power. In some aspects, the target wireless node is a scheduling node for a first link with a second wireless node and is a scheduled node for a second link with a third wireless node, and a power for the first link is determined based at least in part on information relating to a power for the second link.

In some aspects, a power, of the plurality of powers, is determined based at least in part on feedback from the target wireless node, and the feedback includes information identifying at least one of a maximum receive power of the target wireless node or a modulation and coding scheme associated with the target wireless node. In some aspects, a receiver configuration of the target wireless node is adjusted to receive transmissions via the plurality of links from the plurality of other wireless nodes based at least in part on causing the plurality of other wireless nodes to use the plurality of powers, and the receiver configuration relates to a receiver power configuration, a low noise amplifier gain configuration, a receiver filter configuration, an analog beamforming configuration, a digital beamforming configuration, and/or the like.

In some aspects, the receiver configuration is adjusted to suppress a receive power of a link, of the plurality of links, for a transmission from another wireless node of the plurality of other wireless nodes. In some aspects, the receiver configuration is adjusted based at least in part on a prioritization relating to another wireless node of the plurality of other wireless nodes. In some aspects, the control node may determine another plurality of powers for another plurality of links, the other plurality of powers may be selected to control inter-link interference or to satisfy another maximum power criterion, and may cause the target wireless node to transmit, using the other plurality of powers for the other plurality of links, information, to the plurality of other wireless nodes, concurrent with receiving information from the plurality of other wireless nodes. In some aspects, a power, of the plurality of powers, is a transmit power or a receive power.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
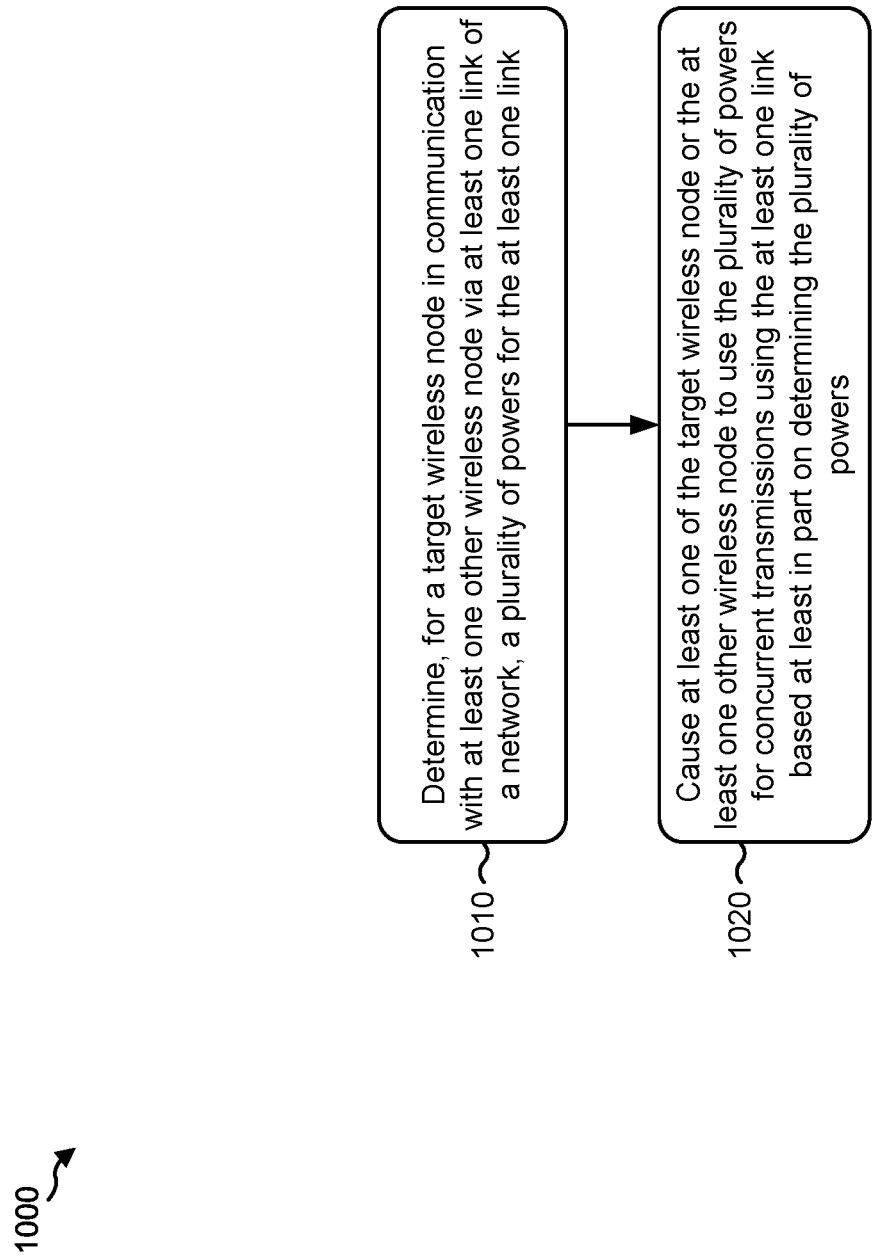
FIG. 10 is a diagram illustrating an example process performed, for example, by a control node, in accordance with various aspects of the present disclosure.

FIG. 10 is a diagram illustrating an example process 1000 performed, for example, by a wireless node, in accordance with various aspects of the present disclosure. Example process 1000 is an example where a control node (e.g., BS 110, UE 120, wireless node 702, wireless node 704, wireless node 805, control node 815, and/or the like) performs power control for concurrent transmissions.

As shown in FIG. 10, in some aspects, process 1000 may include determining, for a target wireless node in communication with at least one other wireless node via at least one link of a network, a plurality of powers for the at least one link (block 1010). For example, the control node (e.g., using controller/processor 240, controller/processor 280, and/or the like) may determine the plurality of powers for the at least one link, as described above. In some aspects, the plurality of powers are selected to control inter-link interference or to satisfy a maximum power criterion.

As shown in FIG. 10, in some aspects, process 1000 may include causing at least one of the target wireless node or the at least one other wireless node to use the plurality of powers for concurrent transmissions using the at least one link based at least in part on determining the plurality of powers (block 1020). For example, the control node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may cause the target wireless node or at least one of the at least one other wireless node to use the plurality of powers for concurrent transmissions, such as a transmission to the target wireless node, a transmission from the target wireless node, and/or the like, as described above.

Process 1000 may include additional aspects, such as any single aspect or any combination of aspects described below and/or in connection with one or more other processes described elsewhere herein.

In some aspects, a first power of the plurality of powers is a transmit power and a second power of the plurality of powers is a receive power. In some aspects, the concurrent transmissions include at least one transmission to the target wireless node from the at least one other wireless node and at least one transmission from the target node to the at least one other wireless node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
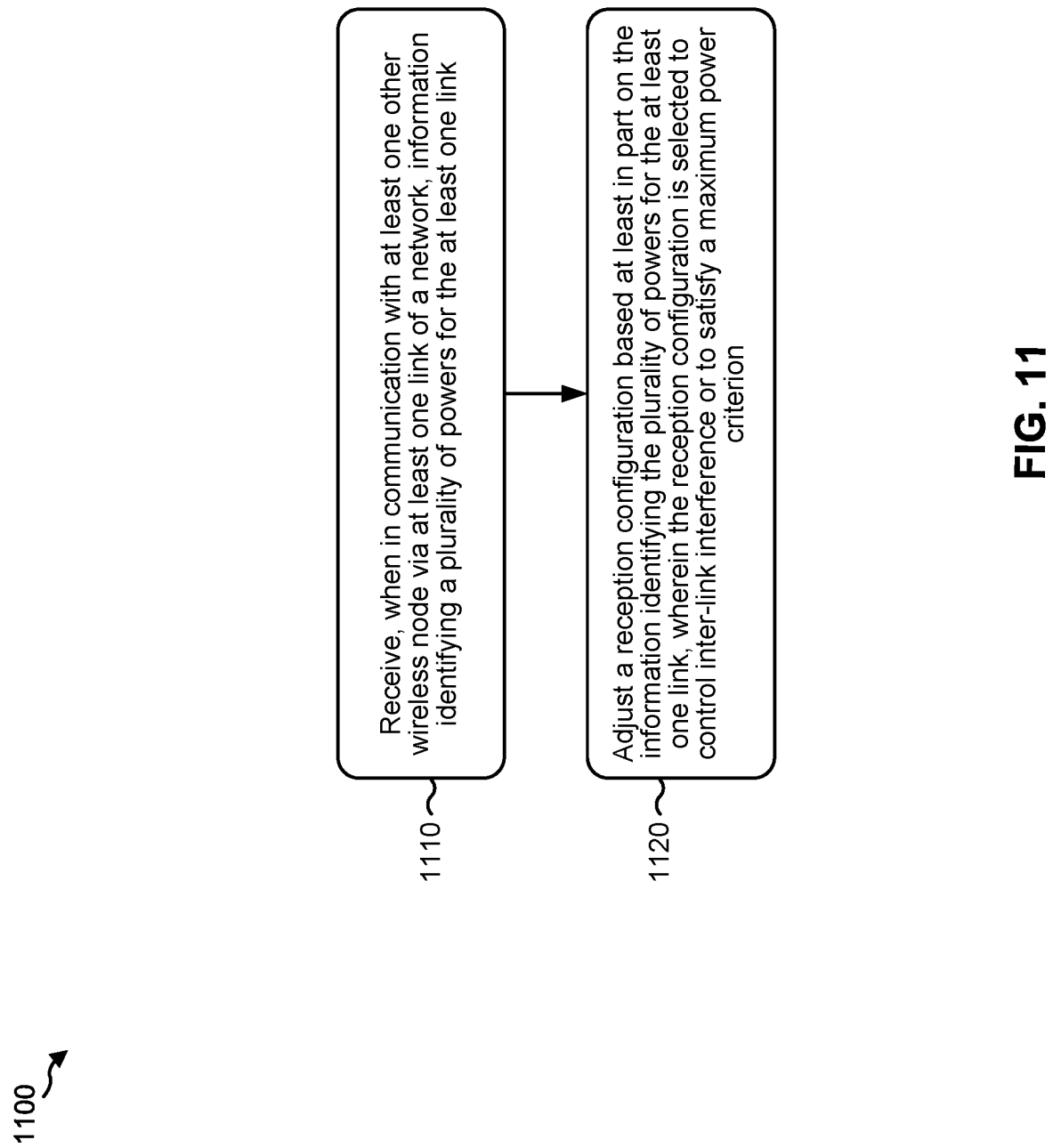
FIG. 11 is a diagram illustrating an example process performed, for example, by a wireless node, in accordance with various aspects of the present disclosure.

FIG. 11 is a diagram illustrating an example process 1100 performed, for example, by a wireless node, in accordance with various aspects of the present disclosure. Example process 1100 is an example where a wireless node (e.g., BS 110, UE 120, wireless node 702, wireless node 704, wireless node 805, control node 815, and/or the like) performs power control for concurrent transmissions.

As shown in FIG. 11, in some aspects, process 1100 may include receiving, when in communication with at least one other wireless node via at least one link of a network, information identifying a plurality of powers for the at least one link (block 1110). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive, when in communication with at least one other wireless node via at least one link of a network, information identifying a plurality of powers for the at least one link, as described above.

As shown in FIG. 11, in some aspects, process 1100 may include adjusting a reception configuration based at least in part on the information identifying the plurality of powers for the at least one link, wherein the reception configuration is selected to control inter-link interference or to satisfy a maxim power criterion (block 1120). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may adjusting a reception configuration based at least in part on the information identifying the plurality of powers for the at least one link, wherein the reception configuration is selected to control inter-link interference or to satisfy a maxim power criterion, as described above.

Process 1100 may include additional aspects, such as any single aspect or any combination of aspects described below and/or in connection with one or more other processes described elsewhere herein.

In some aspects, the wireless node is configured to adjust at least one of: a receiver power configuration, a low noise amplifier gain configuration, a receiver filter configuration, an analog beamforming configuration, or a digital beamforming configuration. In some aspects, the wireless node is configured to adjust the reception configuration to suppress a receive power of a link, of the at least one link, for a transmission from the at least one other wireless node. In some aspects, the wireless node is configured to adjust the reception configuration based at least in part on a prioritization relating to the at least one other wireless node.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects. Methods, devices, non-transitory computer-readable media, apparatuses, and/or the like described herein may include any combination of one or more of the aspects described herein.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a control node, comprising:
   determining, for a target wireless node in communication with a plurality of other wireless nodes via a plurality of links of a network, a plurality of powers for the plurality of links,
      wherein the target wireless node is a first wireless node,
      wherein the plurality of other wireless nodes include a second wireless node and a third wireless node,
      wherein the plurality of powers are selected based on sharing portions of available power for concurrent receptions of a plurality of transmissions, from the second wireless node and the third wireless node, to be less than a threshold maximum power, and
      wherein a power, of the plurality of powers, is determined based at least in part on two or more of:
         a type of signal for transmission on a link of the plurality of links,
         an angular direction of the signal for transmission on the link of the plurality of links,
         a capability of at least one of the first wireless node, the second wireless node, or the third wireless node, or
         a priority for a channel or the signal for transmission on the link of the plurality of links; and
   causing at least one of the target wireless node or the plurality of other wireless nodes to use the plurality of powers for concurrent transmissions to the target wireless node using the plurality of links based at least in part on determining the plurality of powers.

2. The method of claim 1, wherein the second wireless node communicates with the first wireless node via a first link of the plurality of links and the third wireless node communicates with the first wireless node via a second link of the plurality of links; and
   wherein the second wireless node is scheduling communications on the first link and the first wireless node is scheduling communications on the second link.

3. The method of claim 1, wherein the second wireless node communicates with the first wireless node via a first link of the plurality of links and the third wireless node communicates with the first wireless node via a second link of the plurality of links; and
   wherein the second wireless node is scheduling communications on the first link and the third wireless node is scheduling communications on the second link.

4. The method of claim 1, wherein the control node is one of:
   the target wireless node,
   another node of the plurality of other wireless nodes,
   a central unit,
   an integrated access and backhaul (IAB)-donor,
   a scheduler node of the network, or
   a group of nodes.

5. The method of claim 1, wherein signaling, provided to the control node or by the control node, relating to the power includes information identifying at least one of:
   a configuration parameter,
   a request for information identifying the configuration parameter,
   an approval of the configuration parameter,
   a disapproval of the configuration parameter,
   a measurement,
   a capability indication,
   a limitation indication, or
   a schedule.

6. The method of claim 1, wherein signaling, provided to the control node or by the control node, relating to the power is provided via at least one of:
   a downlink control information signal,
   an uplink control information signal,
   a media access control (MAC) control element (CE) signal,
   a radio resource control signal,
   a master information block signal,
   a system information block signal,
   a reference signal,
   a synchronization signal,
   a beam reference signal,
   a physical downlink shared channel signal,
   an acknowledgement signal, a negative acknowledgement signal,
a power indication signal,
an upper layer signaling signal,
an F1-AP signal, or
a modulation and coding scheme indication signal.

7. The method of claim 1,
wherein a first power, of the plurality of powers, is statically determined,
wherein a second power, of the plurality of powers, is dynamically determined, and
wherein the power is the first power or the second power.

8. The method of claim 1, wherein the power is determined further based on at least one of:
a type of the target wireless node,
a type of another wireless node,
a state of the target wireless node,
a state of the other wireless node,
a timing of the signal for transmission on the link of the plurality of links, or
a configuration of the channel or the signal for transmission on the link of the plurality of links.

9. The method of claim 1,
wherein the power is a maximum power for transmission on the link of the plurality of links, and
wherein the maximum power is determined based at least in part the type of signal for transmission or a type of the channel.

10. The method of claim 1, wherein the target wireless node is a scheduling node for a first link with the second wireless node and is a scheduled node for a second link with the third wireless node; and
wherein the power is for the first link and is determined further based at least in part on information relating to a power, of the plurality of powers, for the second link.

11. The method of claim 1, wherein the power is determined further based on feedback from the target wireless node; and
wherein the feedback includes information identifying at least one of a maximum receive power of the target wireless node or a modulation and coding scheme associated with the target wireless node.

12. The method of claim 1, wherein a receiver configuration of the target wireless node is adjusted to receive transmissions via the plurality of links from the plurality of other wireless nodes based at least in part on causing the plurality of other wireless nodes to use the plurality of powers,
wherein the receiver configuration relates to at least one of:
a receiver power configuration,
a low noise amplifier gain configuration,
a receiver filter configuration,
an analog beamforming configuration, or
a digital beamforming configuration.

13. The method of claim 1, further comprising:
determining another plurality of powers for another plurality of links,
wherein the other plurality of powers are selected to control inter-link interference or to satisfy another maximum power criterion; and
causing the target wireless node to transmit, using the other plurality of powers for the other plurality of links, information, to the plurality of other wireless nodes, concurrent with receiving information from the plurality of other wireless nodes.

14. A method of wireless communication performed by a control node, comprising:
determining, for a target wireless node in communication with at least one other wireless node via at least one link of a network, a plurality of powers for the at least one link,
wherein the plurality of powers are selected based on sharing portions of available power for concurrent receptions of a plurality of transmissions, from the at least one other wireless node, to be less than a threshold maximum power, and
wherein a power, of the plurality of powers, is determined based at least in part on two or more of:
a type of signal for transmission on a link of the at least one link,
an angular direction of the signal for transmission on the link of the at least one link,
a capability of at least one of the target wireless node or the at least one other wireless node, or
a priority for a channel or the signal for transmission on the link of the at least one link; and
causing at least one of the target wireless node or the at least one other wireless node to use the plurality of powers for concurrent transmissions using the at least one link based at least in part on determining the plurality of powers.

15. The method of claim 14,
wherein a first power of the plurality of powers is a transmit power and a second power of the plurality of powers is a receive power, and
wherein the power is the first power or the second power.

16. The method of claim 14, wherein the concurrent transmissions include at least one transmission to the target wireless node from the at least one other wireless node and at least one transmission from the target wireless node to the at least one other wireless node.

17. A method of wireless communication performed by a wireless node, comprising:
receiving, when in communication with at least one other wireless node via at least one link of a network, information identifying a plurality of powers for the at least one link,
wherein the plurality of powers are selected based on sharing portions of available power for concurrent receptions of a plurality of transmissions, from the at least one other wireless node, to be less than a threshold maximum power, and
wherein a power, of the plurality of powers, is determined based at least in part on two or more of:
a type of signal for transmission on a link of the at least one link,
an angular direction of the signal for transmission on the link,
a capability of at least one of the wireless node or the at least one other wireless node, or
a priority for a channel or the signal for transmission on the link; and
adjusting a reception configuration based at least in part on the information identifying the plurality of powers for the at least one link,
wherein the reception configuration is selected to control inter-link interference or to satisfy a maximum power criterion.

18. The method of claim 17, wherein the wireless node is configured to adjust at least one of:
a receiver power configuration,
a low noise amplifier gain configuration, a receiver filter configuration,
an analog beamforming configuration, or
a digital beamforming configuration.

19. The method of claim 17, wherein the wireless node is configured to adjust the reception configuration to suppress a receive power of the link for a transmission from the at least one other wireless node.

20. The method of claim 17, wherein the wireless node is configured to adjust the reception configuration based at least in part on a prioritization relating to the at least one other wireless node.

21. A control node, comprising:
a memory; and
one or more processors operatively coupled to the memory, the memory and the one or more processors configured to:
determine, for a target wireless node in communication with a plurality of other wireless nodes via a plurality of links of a network, a plurality of powers for the plurality of links,
wherein the target wireless node is a first wireless node,
wherein the plurality of other wireless nodes include a second wireless node and a third wireless node,
wherein the plurality of powers are selected based on sharing portions of available power for concurrent receptions of a plurality of transmissions, from the second wireless node and the third wireless node, to be less than a threshold maximum power, and
wherein a power, of the plurality of powers, is determined based at least in part on two or more of:
a type of signal for transmission on a link of the plurality of links,
an angular direction of the signal for transmission on the link of the plurality of links,
a capability of at least one of the first wireless node, the second wireless node, or the third wireless node, or
a priority for a channel or the signal for transmission on the link of the plurality of links; and
cause at least one of the target wireless node or the plurality of other wireless nodes to use the plurality of powers for concurrent transmissions to the target wireless node using the plurality of links based at least in part on determining the plurality of powers.

22. The control node of claim 21, wherein the second wireless node communicates with the first wireless node via a first link of the plurality of links and the third wireless node communicates with the first wireless node via a second link of the plurality of links; and
wherein the second wireless node is scheduling communications on the first link and the first wireless node is scheduling communications on the second link.

23. The control node of claim 21, wherein the second wireless node communicates with the first wireless node via a first link of the plurality of links and the third wireless node communicates with the first wireless node via a second link of the plurality of links; and
wherein the second wireless node is scheduling communications on the first link and the third wireless node is scheduling communications on the second link.

24. The control node of claim 21, wherein the control node is one of:
the target wireless node,
another node of the plurality of other wireless nodes,
a central unit,
an integrated access and backhaul (IAB)-donor,
a scheduler node of the network, or
a group of nodes.

25. The control node of claim 21, wherein signaling, provided to the control node or by the control node, relating to the power includes information identifying at least one of:
a configuration parameter,
a request for information identifying the configuration parameter,
an approval of the configuration parameter,
a disapproval of the configuration parameter,
a measurement,
a capability indication,
a limitation indication, or
a schedule.

26. The control node of claim 21, wherein signaling, provided to the control node or by the control node, relating to the power is provided via at least one of:
a downlink control information signal,
an uplink control information signal,
a media access control (MAC) control element (CE) signal,
a radio resource control signal,
a master information block signal,
a system information block signal,
a reference signal,
a synchronization signal,
a beam reference signal,
a physical downlink shared channel signal,
an acknowledgement signal,
a negative acknowledgement signal,
a power indication signal,
an upper layer signaling signal,
an F1-AP signal, or
a modulation and coding scheme indication signal.

27. The control node of claim 21,
wherein a first power, of the plurality of powers, is statically determined,
wherein a second power, of the plurality of powers, is dynamically determined, and
wherein the power is the first power or the second power.

28. The control node of claim 21, wherein the power is determined further based on at least one of:
a type of the target wireless node,
a type of another wireless node,
a state of the target wireless node,
a state of the other wireless node,
a timing of the signal for transmission on the link of the plurality of links, or
a configuration of the channel or the signal for transmission on the link of the plurality of links.

29. The control node of claim 21, wherein the determining comprises:
wherein the power is a maximum power for transmission on the link of the plurality of links, and
wherein the maximum power is determined based at least in part the type of signal for transmission or a type of the channel.

30. The control node of claim 21, wherein the target wireless node is a scheduling node for a first link with the second wireless node and is a scheduled node for a second link with the third wireless node; and
wherein the power is for the first link and is determined further based at least in part on information relating to a power, of the plurality of powers, for the second link.

31. An apparatus for wireless communication, comprising:

means for determining, for a target wireless node in communication with a plurality of other wireless nodes via a plurality of links of a network, a plurality of powers for the plurality of links,
  wherein the target wireless node is a first wireless node,
  wherein the plurality of other wireless nodes include a second wireless node and a third wireless node,
  wherein the plurality of powers are selected based on sharing portions of available power for concurrent receptions of a plurality of transmissions, from the second wireless node and the third wireless node, to be less than a threshold maximum power, and
  wherein a power, of the plurality of powers, is determined based at least in part on two or more of:
    a type of signal for transmission on a link of the plurality of links,
    an angular direction of the signal for transmission on the link of the plurality of links,
    a capability of at least one of the first wireless node, the second wireless node, or the third wireless node, or
    a priority for a channel or the signal for transmission on the link of the plurality of links; and
  means for causing at least one of the target wireless node or the plurality of other wireless nodes to use the plurality of powers for concurrent transmissions to the target wireless node using the plurality of links based at least in part on determining the plurality of powers.

32. An apparatus for wireless communication, comprising:
  means for determining, for a target wireless node in communication with at least one other wireless node via at least one link of a network, a plurality of powers for the at least one link,
  wherein the plurality of powers are selected based on sharing portions of available power for concurrent receptions of a plurality of transmissions, from the at least one other wireless node, to be less than a threshold maximum power, and
  wherein a power, of the plurality of powers, is determined based at least in part on two or more of:
    a type of signal for transmission on a link of the at least one link,
    an angular direction of the signal for transmission on the link,
    a capability of at least one of the target wireless node or the at least one other wireless node, or
    a priority for a channel or the signal for transmission on the link; and
  means for causing at least one of the target wireless node or the at least one other wireless node to use the plurality of powers for concurrent transmissions using the at least one link based at least in part on determining the plurality of powers.

33. The method of claim 1,
wherein the plurality of links include:
  a first link between the first wireless node and the second wireless node, and
  a second link between the first wireless node and the third wireless node, and wherein the plurality of powers include:
  a first power for the first link, and
  a second power for the second link.

* * * * *